US009777233B1

(12) United States Patent
Melde et al.

(10) Patent No.: US 9,777,233 B1
(45) Date of Patent: Oct. 3, 2017

(54) SORBENT DESIGN FOR IMPROVED GLYCEROL ADSORPTION

(71) Applicant: The United States of America, as represented by the Secretary of the Navy, Washington, DC (US)

(72) Inventors: Brian Melde, Alexandria, VA (US); Brandy J. White, Washington, DC (US); Martin H. Moore, Woodbridge, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/472,925

(22) Filed: Mar. 29, 2017

Related U.S. Application Data (60) Provisional application No. 62/314,577, filed on Mar. 29, 2016.

(51) Int. Cl.
*C11B 3/10* (2006.01)
*C10L 1/02* (2006.01)
*B01J 20/26* (2006.01)

(52) U.S. Cl.
CPC .............. *C10L 1/026* (2013.01); *B01J 20/262* (2013.01); *C10L 2200/0476* (2013.01); *C10L 2270/026* (2013.01); *C10L 2290/542* (2013.01)

(58) Field of Classification Search
CPC ....................................................... C10L 1/026
USPC ........................................................ 554/187
See application file for complete search history.

(56) References Cited

U.S. PATENT DOCUMENTS

| 4,469,805 | A | 9/1984 | Kofke, Jr. et al. |
| 5,321,102 | A | 6/1994 | Loy et al. |
| 5,396,020 | A | 3/1995 | Lansbarkis |
| 5,449,853 | A | 9/1995 | Lansbarkis et al. |
| 6,673,246 | B2 | 1/2004 | Markowitz et al. |
| 7,749,438 | B2 | 7/2010 | Zeinali et al. |
| 7,754,145 | B2 | 7/2010 | White et al. |
| 2008/0289496 | A1* | 11/2008 | Poshusta ................ C10G 25/00 95/113 |
| 2013/0053591 | A1* | 2/2013 | Seidel ..................... C10L 1/026 554/174 |

FOREIGN PATENT DOCUMENTS

| KR | 10-0959417 | | 5/2010 |
| KR | 100958417 | B1 * | 5/2010 |

OTHER PUBLICATIONS

Johnson, Brandy J. et al., 'Functionalized organosilicate materials for irritant gas removal'. Chemical Engineering Science, Jan. 22, 2012, vol. 68, Issue 1, pp. 376-382.*

(Continued)

*Primary Examiner* — Deborah D Carr
(74) *Attorney, Agent, or Firm* — US Naval Research Laboratory; Roy Roberts (57) ABSTRACT

Mesoporous organosilica sorbents are effective to remove contaminants (such as glycerol or detergent) from biodiesel. Contacting biodiesel with various a mesoporous organosilica sorbents comprising phenyl and sulfonate moieties resulted in the contaminants being absorbed by the sorbent and thus removed from the biodiesel.

6 Claims, 9 Drawing Sheets

(56) References Cited

OTHER PUBLICATIONS

Canck, Els De et al., 'Periodic Mesoporous Organosilica Functionalized with Sulfonic Acid Groups as Acid Catalyst for Glycerol Acetylation', Aug. 16, 2013, vol. 6 , No. 8, pp. 3556-3570.*
Chen, B.; Wang, W. S.; Liu, X.; Xue, W. M.; Ma, X. X.; Chen, G. L.; Yu, Q. S.; Li, R. Industrial & Engineering Chemistry Research 2012, 51, 12933-12939.
Johnson, B. J.; Melde, B. J.; Peterson, G. W.; Schindler, B. J.; Jones, P. Chemical Engineering Science 2012, 68, 376-382.
Nakanishi, K.; Kobayashi, Y.; Amatani, T.; Hirao, K.; Kodaira, T. Chem Mater 2004, 16, 3652-3658.
Nakanishi et al. "Multiscale Templating of Siloxane Gels via Polymerization-Induced Phase Separation" *Chem. Mater.*, 2008, 20 (3), pp. 1108-1115.
International Search and Opinion dated Jul. 11, 2017 in PCT/US2009/123456.
DeCanck, Els et al., 'Periodic Mesoporous Organosilica Functionalized with Sulfonic Acid Groups as Acid Catalyst for Glycerol Acetylation' , Materials, Aug. 2013, vol. 6. No. 8, pp. 3556-3570.

\* cited by examiner

SORBENT DESIGN FOR IMPROVED GLYCEROL ADSORPTION

CROSS-REFERENCE TO RELATED APPLICATIONS

This Application claims the benefit of U.S. Provisional Application 62/314,577 filed on Mar. 29, 2017, the entirety of which is incorporated herein by reference.

BACKGROUND

Biodiesel is produced by transesterification of animal fat, vegetable oil, or waste cooking oil with an alcohol, producing the desired biodiesel fuel along with glycerol as a byproduct. A number of studies have focused on the evaluation of the economic viability of biodiesel.[2-5] Production costs are approximately 0.5 USD/L, 1.5 times that of petroleum-based diesel, with virgin feedstocks comprising 50 to 70% of costs.[3,4] The feedstock costs can be reduced through the use of waste cooking oils and similar products, but these materials increase the complexity of synthesis and, often, the presence of contaminants.[5] In addition to providing a renewable source of energy, biodiesel is attractive as an alternative fuel due to related reduced environmental impact; use of these fuels decreases emission of atmospheric pollutants.[6] Procuring water together with liquid and solid waste disposal comprise up to 10% of manufacturing costs,[3,4] while also influencing the environmental impact of this alternative fuel source. As an example, multiple wash steps for biodiesel purification can generate gallons of waste water for each gallon of usable biofuel. Biodiesel contaminants include glycerol, alcohols, free fatty acids, surfactants, and residual catalyst. Glycerol, while a contaminant in biodiesel, can be recovered and purified to aid in offsetting the costs of biodiesel production.[4]

Contaminants (including glycerol) can be removed from biodiesel via the use of dry wash media as an alternative or partial replacement for water washing. Currently, use of dry wash media for cleaning biodiesel is largely limited to small operations and hobbyists. Using dry wash media avoids excessive waste water production while reducing production time and requiring less space when compared to water washing. BD ZorbX and DudaLite (DW-R10®) ion exchange resin are commercial examples of types of materials used for this purpose. BD ZorbX is a mixture of cellulose fibers from hardwood intended to absorb a variety of contaminants including surfactants, glycerol, and catalyst; Eco2Pure™ is a similar material. DW-R10 is intended as a polishing step following bulk glycerol removal, and it is claimed to remove surfactants, glycerol, catalyst, and water. Drionex, Purolite® PD206, and Magnesol D-Sol are intended for similar applications.

A need exists for alternative sorbent materials.

BRIEF SUMMARY

Sulfonated sorbents can capture targets from complex mixtures. Described herein are sorbents directed at removal of undesirable contaminates in fuel preparations. In particular, the sorbents developed under this effort are intended for use in the removal of glycerol and surfactants from fuel preparations. Their application may be (for example) (1) as dry wash polishing media, (2) for purification processes, or (3) as part of an analytical process for evaluation of fuel quality.

In one embodiment, a method of removing a contaminant (such as glycerol and/or detergent) from biodiesel includes contacting a mesoporous organosilica sorbent comprising phenyl and sulfonate moieties with a biodiesel containing a contaminant; then separating the biodiesel from the sorbent, whereby a fraction of the contaminant in the biodiesel is absorbed by the sorbent and thus removed from the biodiesel.

BRIEF DESCRIPTION OF THE DRAWINGS

In FIG. 2B, S65-Ph is represented by a line with two long dashes and a short dash, S85-Ph is represented by a line with one long dash and two short dashes, E25-Ph is represented by a line with widely-spaced medium dashes, and E50-Ph is represented by a line with closely-spaced smaller dashes.

In FIGS. 4A and 4C, the curves represent, from top to bottom, D13a, D13c, and D13-Ph. In FIG. 4B the top curve is D13-Ph2 and the lower curve is D13-Ph. In FIG. 4D, D13-Ph2 has two long dashes and a short dash (heavier weight) while D13-Ph has two long dashes and a short dash (lighter weight).

Regarding the above identification of lines and curves by relative position, this relates to their relative position at the mid-point of the X axis.

DETAILED DESCRIPTION

Definitions

Before describing the present invention in detail, it is to be understood that the terminology used in the specification is for the purpose of describing particular embodiments, and is not necessarily intended to be limiting. Although many methods, structures and materials similar, modified, or equivalent to those described herein can be used in the practice of the present invention without undue experimentation, the preferred methods, structures and materials are described herein. In describing and claiming the present invention, the following terminology will be used in accordance with the definitions set out below.

As used in this specification and the appended claims, the singular forms "a", "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

Overview

The sorbents developed under this effort are intended for use in the removal of glycerol and surfactants from fuel preparations. Their application may be (for example) (1) as dry wash polishing media, (2) for purification processes, or (3) as part of an analytical process for evaluation of fuel quality.

Hierarchical nanoporous scaffolds offer an alternative to currently available commercial dry wash media. The materials under consideration are hybrid inorganic-organic materials[7-17] in which inorganic and organic moieties are mixed on the molecular scale through the use of bridged polysilsesquioxane precursors.[18] The materials offer large macropores with a templated mesopore structure.[7,12,17,19] While a number of applications have been reported for mesoporous sorbents, additional applications can be facilitated through the use of these hierarchical structures; the macroscale features reduce diffusion limitations and increase access to the mesopore volumes.[20,21] Materials of this type have been used for the capture of nitroenergetic and organophosphate targets.[20,21] The materials of the current study were developed for adsorption of glycerol, which can result in fuel tank deposits, injector corrosion, and higher emissions of aldehydes. The materials are synthesized with varying composition of the pore walls then sulfonated to promote hydrogen bonding interactions with glycerol. While this sulfonation of the material provides a similar functionality to that present in several of the dry wash media mentioned above, incorporation of the sulfonate groups on and within the scaffold and adjacent to varying structures provides an avenue for significant improvements in performance through scaffold tailoring.

Description and Operation

Synthesis of Sorbent Materials

E25-Ph and E50-Ph: Scaffold materials were synthesized as described in previous reports.[21,23] Pluronic P123 (3.8 g) and 0.5 g of mesitylene (E25) or 1.0 g of mesitylene (E50) were dissolved in 12.14 g of 0.1 M $HNO_3$ with heat (~65° C.) and magnetic stirring. The stirring mixture was allowed to cool to room temperature before drop-wise addition of 4.24 g of 1,2-bis(trimethoxysilyl)ethane. The mixture was stirred to homogenize (~1 min) and transferred to culture tubes. Tubes were tightly sealed and incubated in an oven at 60° C. overnight. The tubes were unsealed, and the white monolithic gels were heated for 2 d at 60° C. followed by 2 d at 80° C. The block copolymer (Pluronic P123) was extracted from the dried materials by refluxing over-night in 1 M HCl in ethanol. The solid was collected by vacuum filtration; this process was repeated 2 more times. The collected solid was washed thoroughly with ethanol and water and dried at 110° C.

Grafting with phenyl groups followed a simple published procedure, beginning with an additional drying step at >100° C. in a vacuum.[24] Sorbent (1.0 g) was refluxed with 5 mL of phenyltriethoxysilane in 50 mL of toluene for 24 h. Grafted material was collected by gravity filtration, washed thoroughly with ethanol, and dried at 110° C. Sulfonation was accomplished as described previously by magnetically stirring the phenyl-grafted material in 25 mL of $H_2SO_4$ at 75° C. for 1 d.[25] The acidic mixture was then added to ≥200 mL of $H_2O$. Solid was collected by gravity filtration, washed with $H_2O$, and dried at 110° C. Sulfonated material was magnetically stirred in 50 mL of 1 M NaCl solution at RT for 1 d followed by collection by gravity filtration, washing with $H_2O$, and drying at 110° C.

ED11-Ph1, ED11-Ph2, and ED11: The base scaffold was synthesized as described previously.[26] Pluronic P123 (3.8 g) and mesitylene (1.0 g) were dissolved in 15.0 g of 0.1 M $HNO_3$ with heat (~65° C.) and magnetic stirring. The stirring mixture was then allowed to cool to room temperature. A silane mixture of 1,2-bis(trimethoxysilyl)ethane (2.12 g) and bis(trimethoxysilylethyl)benzene (2.94 g) was added drop-wise, and the mixture was stirred to homogenize (~1 min). The mixture was transferred to culture tubes that were tightly sealed and incubated in an oven at 60° C. overnight. The tubes were unsealed, and the white monolithic gels were heated for 2 d at 60° C. followed by 2 d at 80° C. The block copolymer was extracted from the dried materials by refluxing overnight in 1 M HCl in ethanol; the solid was collected by vacuum filtration. This process was repeated 2 more times. The collected solid was washed thoroughly with ethanol and water, then dried at 110° C. Grafting, sulfonation, and sodium exchange for ED11-Ph1 and ED11-Ph2 were completed using the protocols described above; ED11-Ph1 and ED11-Ph2 refer to similarly but separately synthesized materials. The sulfonation step produces the variation in materials characteristics. ED11 was not grafted with phenyl groups prior to sulfonation and sodium exchange.

S65-Ph and S85-Ph: Scaffold materials were synthesized based on a previously published procedure.[27,28] Pluronic P123 (4.0 g) and 0.65 g (S65) or 0.85 g (S85) mesitylene were dissolved in 12.0 g of 1.0 M $HNO_3$ with heat (~65° C.) and magnetic stirring. The mixture was allowed to cool to room temperature before drop-wise addition of 5.15 g tetramethyl orthosilicate, and the mixture was stirred to homogenize (~1 min). The mixture was transferred to culture tubes that were tightly sealed and incubated at 60° C. overnight. The tubes were unsealed, and the white monolithic gels were heated at 60° C. for 6 d. The material was calcined under ambient atmosphere: temperature was ramped 1° C/min to 650° C. and held for 5 h. Material was refluxed in 1 M HCl for 1 d, similar to the solvent extraction process for other materials, to condition the surface similarly for grafting. It was then collected by vacuum filtration, washed with ethanol and $H_2O$, and dried at 110° C. Grafting, sulfonation, and sodium exchange for these sorbents were completed using the protocols described above.

D13-Ph, D13a, D13b, D13c, and D13-Ph2: Scaffold materials were synthesized by dissolving Pluronic P123 (3.8 g) and mesitylene (1.8 g) in 16.0 g of 0.1 M $HNO_3$ with heat (~65° C.) and magnetic stirring. The mixture was allowed to cool to room temperature prior to drop-wise addition of bis(trimethoxysilylethyl)benzene (5.87 g), and the mixture was stirred to homogenize it (~1 min). The mixture was transferred to culture tubes that were tightly sealed and incubated in an oven at 60° C. overnight. The tubes were unsealed, and the white monolithic gels were heated for 2 d at 60° C. and 2 d at 80° C. Block copolymer was extracted from the dried materials by refluxing overnight in 1 M HCl in ethanol; the solid was collected by vacuum filtration. This process was repeated 2 more times. The collected solid was washed thoroughly with ethanol and water, then dried at 110° C. Grafting, sulfonation, and sodium exchange for D13-Ph were completed using the protocols described above. D13a, D13b, and D13c were not grafted with phenyl groups prior to sulfonation and sodium exchange; the designations a, b, and c refer to similarly but separately synthesized materials. D13b in particular was sulfonated using 50% $H_2SO_4$ rather than undiluted acid. D13-pH2 is the same type of material as D13-Ph but was sulfonated with 50% $H_2SO_4$ in the way that D13b was treated.

PDVB-2 and PDVB-3: Divinylbenzene (DVB) resins were synthesized in a Teflon-lined autoclave reactor (23 mL capacity) using a procedure adapted from Libuše Hanková et al. "Role of Water as a Coporogen in the Synthesis of Mesoporous Poly(divinylbenzene)," Journal of Applied Polymer Science, 2014, DOI:10.1002/app.41198, incorporated herein by reference for this teaching. For PDVB-2, DVB (1.5 g; Aldrich technical grade, 80%) was added to tetrahydrofuran (15 mL) with water (0.75 mL) and 2,-2'-azobis(2-methylpropionitrile) (0.0375 g; Aldrich, 98%). The reactor was heated at 100° C. for 48 h. Following cooling to room temperature, the reactor was opened and the resin was allowed to dry overnight at room temperature followed by complete drying at 100° C. PDVB-3 was synthesized identically with the exception of the water coporogen used in the PDVB-2 synthesis which was omitted. Ground resin was added to hexane (20 mL) to produce a wet slurry, and sulfuric acid was added (25 mL) for the sulfonation step. The mixture was heated at 75° C. for 1 d before addition of water (300 mL). Sulfonated material was collected by vacuum filtration and washed thoroughly with water before drying at 100° C. Sodium exchange was completed by stirring the material in 1 M NaCl (50 mL) at room temperature for 1 d. The resin was then washed with water, collected by vacuum filtration, and dried at 100° C.

Sorbent Characteristics

Figure 1:
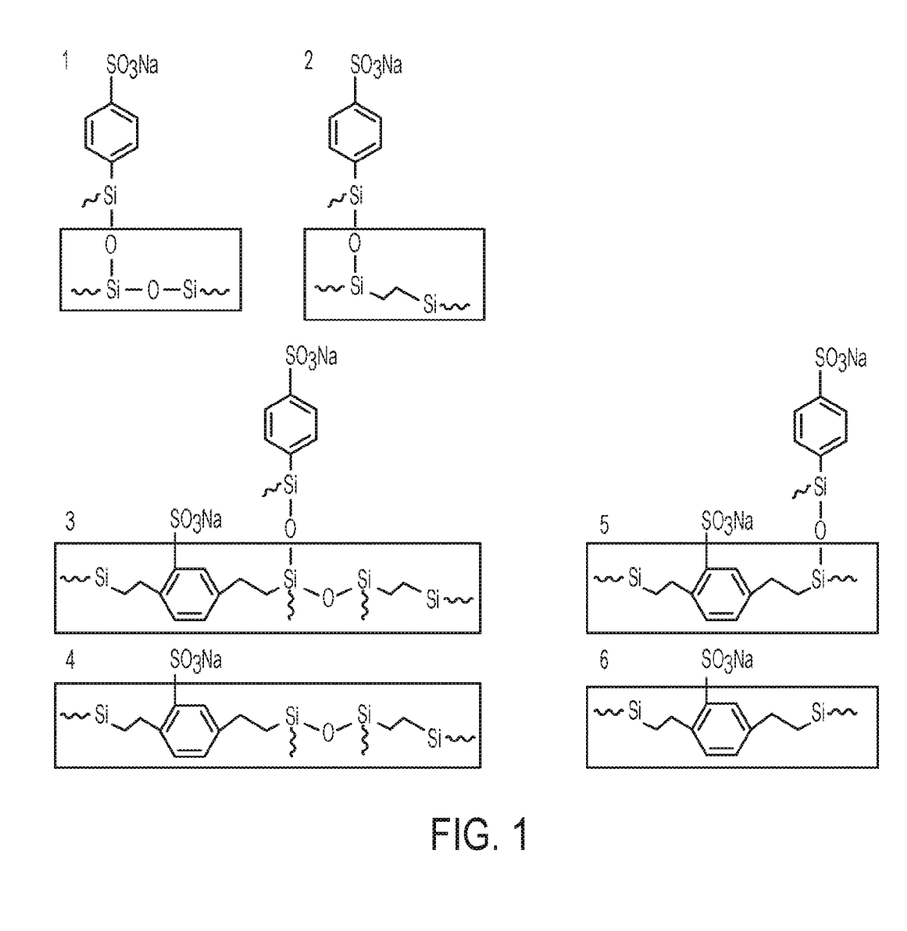
FIG. 1 shows various structures related to sorbent compositions. The material variants are presented here showing both the sorbent scaffold (boxed area) and the groups added during post-synthesis processing.

Sulfonation of poly-(styrene-co-divinylbenzene) resin has been described for increasing hydrogen bonding with and, therefore, removal of glycerol by resin material.[29] The previous work in this area did not consider the impact of the scaffold or the morphology of the resin on target adsorption. Because the chemical structures in close proximity to the sulfonate groups are likely to impact the interaction of those groups with glycerol, a series of porous organosilicate materials in which the pore wall composition has been varied was synthesized. Many cases were considered; S65/S85 and E25/E50 offer no sites for sulfonation on the base sorbent. ED11 and D13 offer phenyl rings that comprise at least a portion of the bridging groups. Sulfonation of the materials directly (ED11 and D13) or sulfonation following grafting of additional phenyl groups were completed for this range of materials. The schematic provided in FIG. 1 illustrates the variations in the resulting materials.

Table 1 provides a summary of morphological characteristics for these materials.

TABLE 1

Morphological characteristics for the sulfonated sorbents.

| Material | Type | Surface Area ($m^2$/g) | Pore Volume ($cm^3$/g) | Pore Diameter (Å) |
|---|---|---|---|---|
| S65-Ph | 1 | 515 | 0.548 | 56 |
| S85-Ph | 1 | 578 | 0.626 | 64 |
| E25-Ph | 2 | 803 | 0.740 | 64 |
| E50-Ph | 2 | 883 | 0.664 | 51* |
| ED11-Ph1 | 3 | 147 | 0.151 | 48 |
| ED11-Ph2 | 3 | 27 | 0.047 | 50 |
| ED11 | 4 | 87 | 0.111 | 55 |
| D13-Ph | 5 | 4.0 | 0.010 | —* |
| D13-Ph2 | 5 | 310 | 0.510 | 67 |
| D13a | 6 | 3.1 | 0.007 | —* |
| D13b | 6 | 337 | 0.536 | 75 |
| D13c | 6 | 3.2 | 0.013 | —* |
| ED13 | — | 478 | 0.527 | 56 |
| PDVB-2 | — | 405 | 0.564 | 126 |
| PDVB-3 | — | 336 | 0.375 | 65 |

*Broad; no well-defined peak in the pore size distribution

Figure 2A:
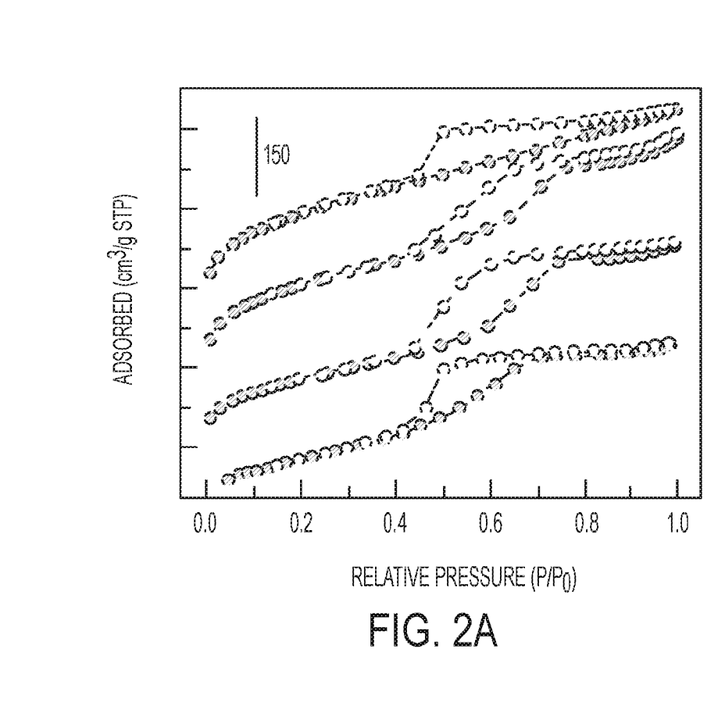
FIG. 2A shows nitrogen sorption analysis for several sulfonated sorbents and FIG. 2B shows pore size distributions for the same sorbents. In each FIG. 2A, the curves appear in the following order from bottom to top: S65-Ph, S85-Ph, E25-Ph, and E50-Ph.
Figure 2B:
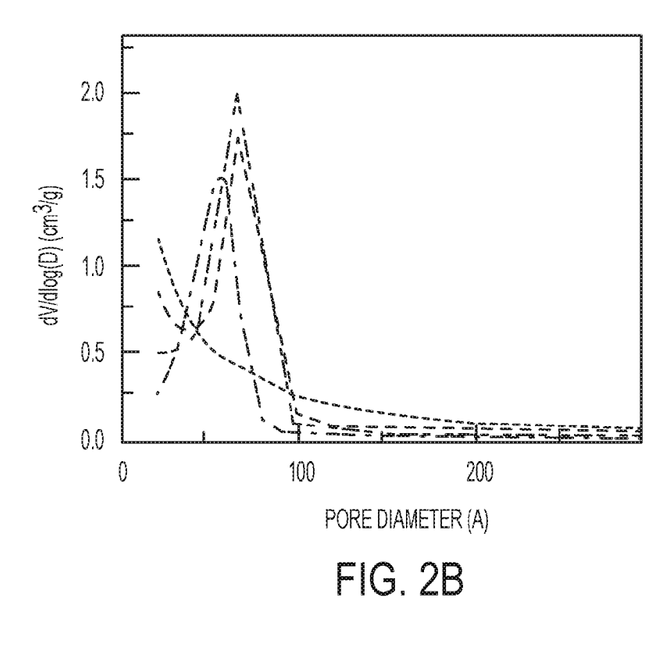

FIG. 1 illustrates chemical structures of various types of sorbents described here, by type number 1 through 6. The Type 1 materials (FIG. 1) provide a sodium-exchanged, sulfonated phenyl group pendant on a silicate scaffold. Nitrogen sorption analysis indicates type IV isotherms characteristic of mesoporous materials (FIG. 2A). The silicate scaffolds are ordered mesostructures with 2D hexagonally packed cylindrical mesopores. The pore sizes in the two materials are influenced by the amounts of mesitylene swelling agent included in the syntheses.[27,28] The Type 2 materials provide the same pendant functional group on an ethane-bridged organosilicate sorbent. The base E50 scaffold offers a combination of disordered micropores and mesopores (FIG. 2B). The type IV nitrogen sorption isotherm of the E25 sorbent is similar to those of S65-Ph and S85-Ph.

Figure 3A:
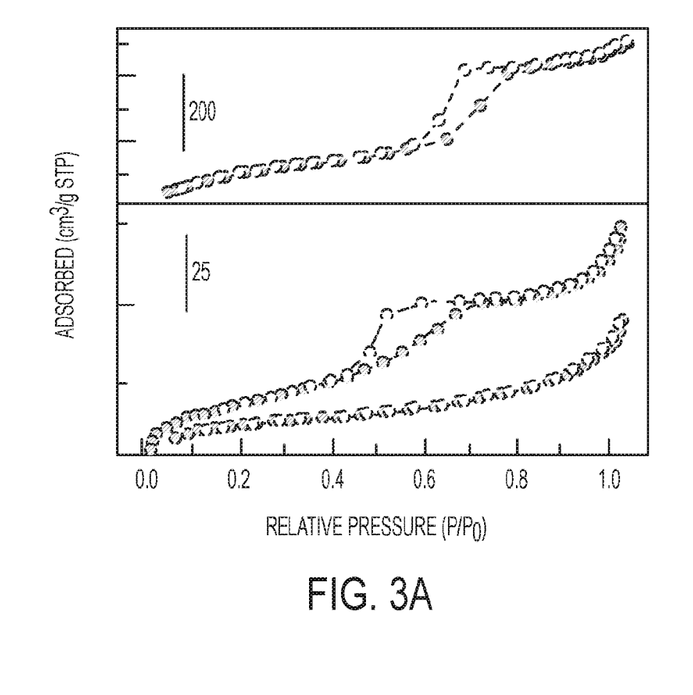
FIG. 3A shows nitrogen sorption analysis for additional sulfonated sorbents: top panel ED11-Ph1; lower panel top curve ED11 and lower curve ED11-Ph2.
Figure 3B:
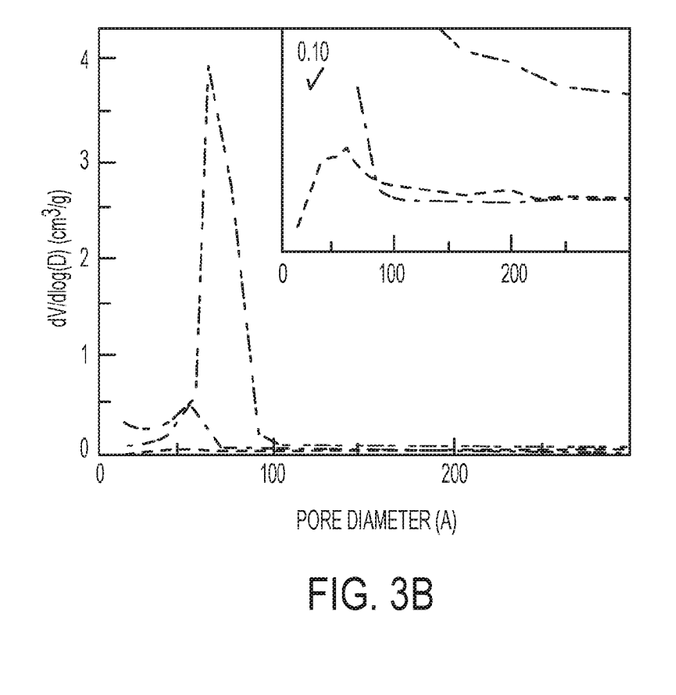
FIG. 3B shows pore size distributions for the same sorbents, labeled as follows: ED11 (two long dashes and a short dash), ED11-Ph1 (two short dashes and a long dash), and ED11-Ph2 (medium dashes).
Figure 4A:
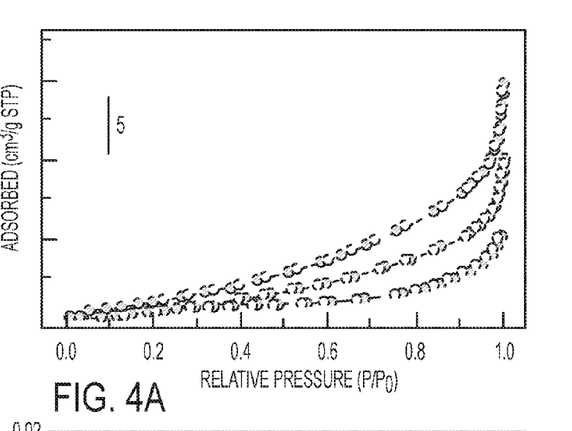
FIGS. 4A, 4B, 4C, and 4D show nitrogen sorption analysis (A and B) and pore size distribution (C and D), for further sulfonated sorbents.
Figure 4B:
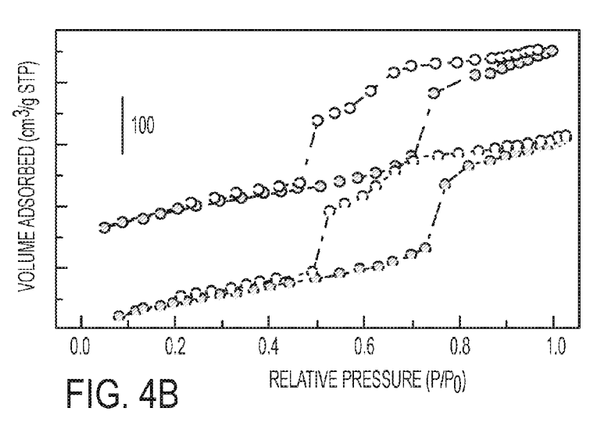
Figure 4C:
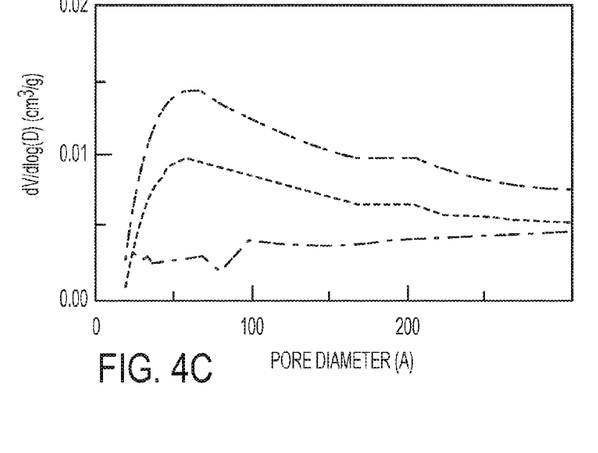
Figure 4D:
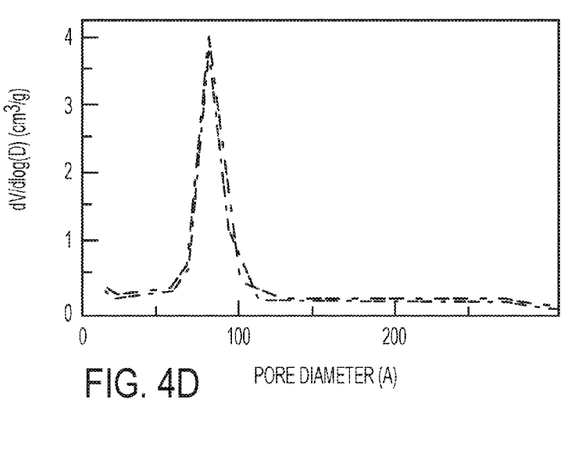

Type 3 materials, based on ED11, have 50% of the ethane bridging groups of the E50 and E25 scaffolds replaced with diethylbenzene groups. This provided the potential for direct sulfonation of phenylene groups within the pore walls in addition to the grafted phenyl groups. Type 4 sorbents are sodium-exchanged sulfonated ED11 with no grafted phenyl moieties. Most products sulfonated with undiluted $H_2SO_4$ display type II nitrogen sorption isotherms indicative of relatively non-porous materials (e.g. ED11-Ph2 in FIG. 3).

Figure 5A:
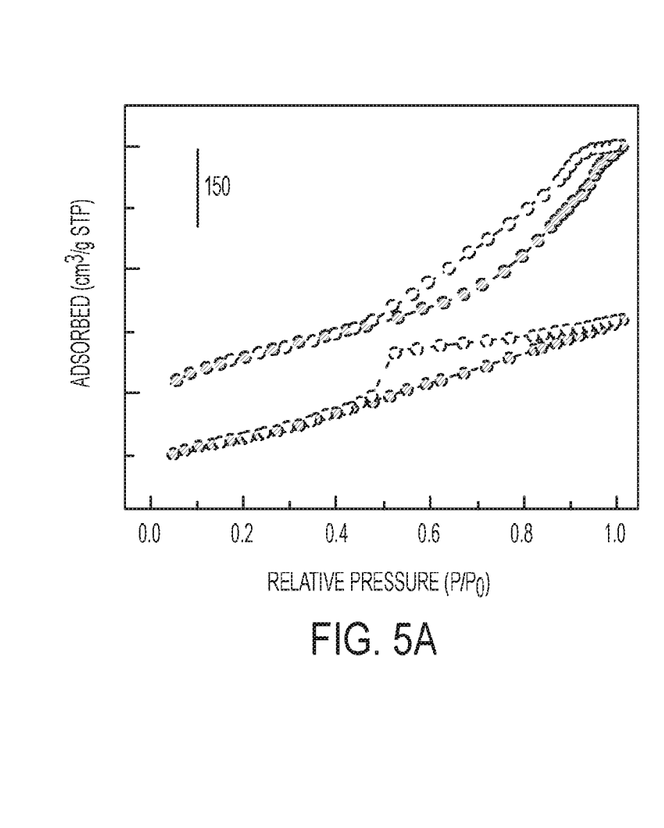
FIGS. 5A and 5B show nitrogen sorption analysis and pore size distribution, respectively, for sulfonated resins. In each of these, the top curve is PDVB-2 and the lower curve is PDVB-3.
Figure 5B:
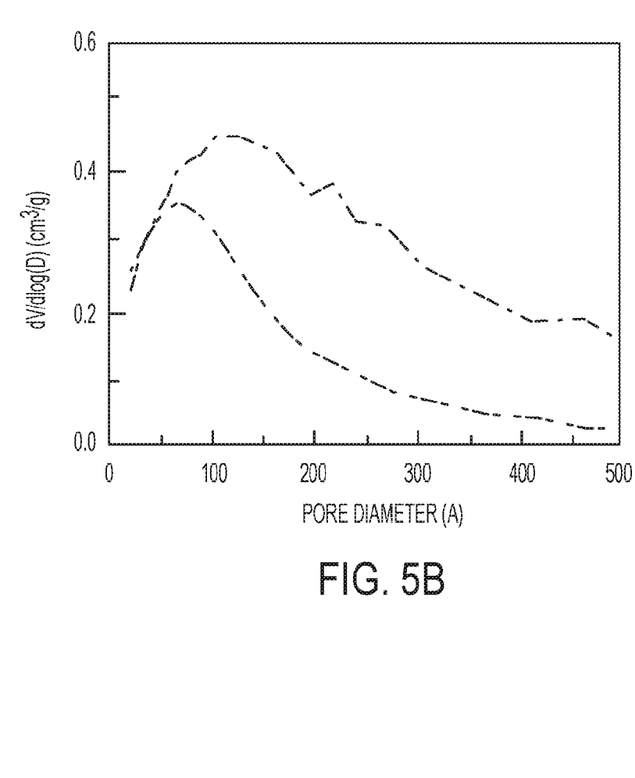
Figure 6:
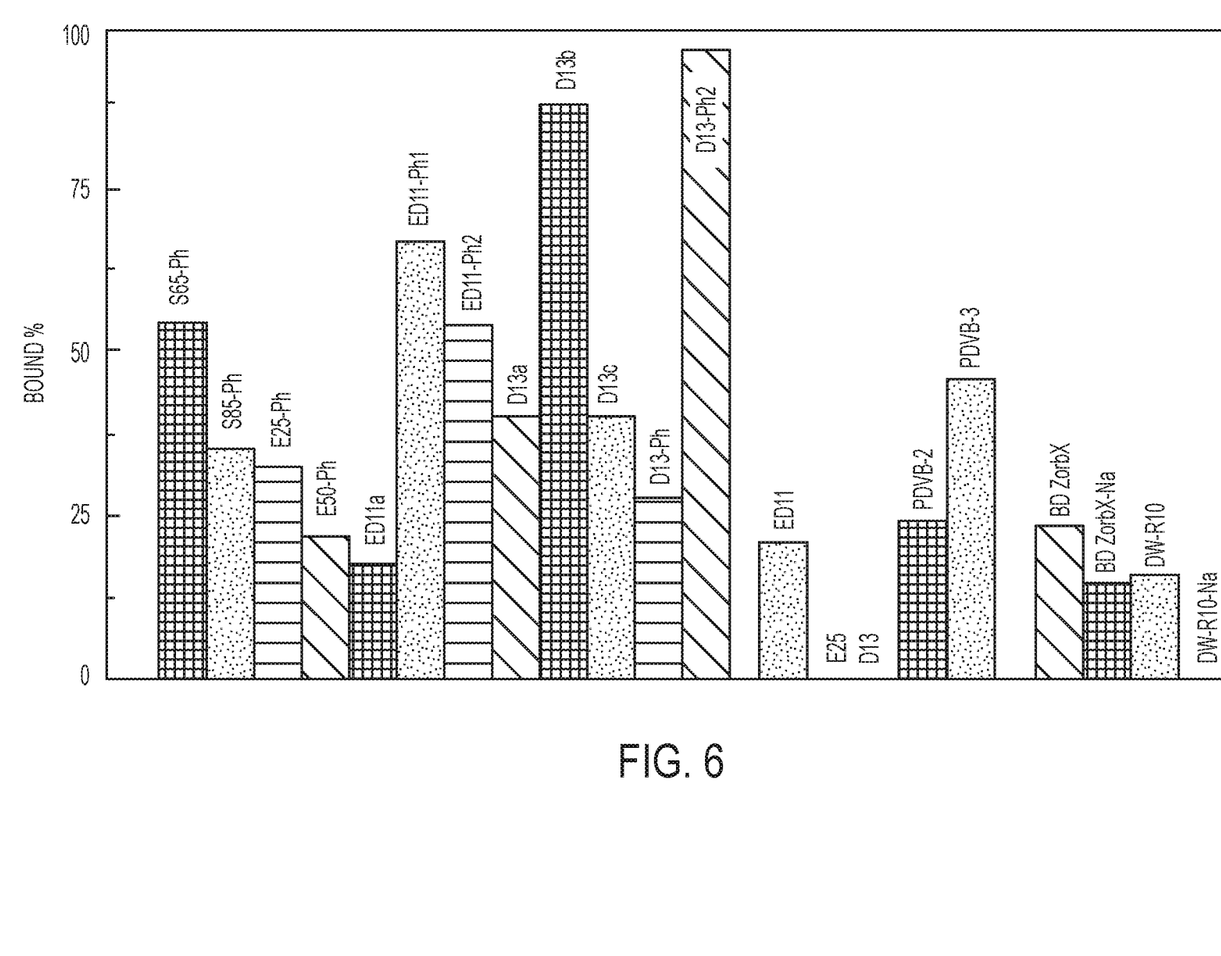
FIG. 6 shows glycerol binding by sorbents. Experiment used a solution consisting of 271 µM glycerol in water (10 mL) with 30 mg sorbent.

Type 5 and 6 sorbents, based on D13, have the highest concentration of diethylbenzene bridging groups in their scaffold walls; Type 5 sorbents also include grafted pendant phenyl moieties. Functionalization using undiluted $H_2SO_4$ leads to collapse of the mesostructure (FIG. 4). D13b was treated with 50% $H_2SO_4$, preserving the mesostructure (FIG. 4). The nitrogen isotherm shows considerable hysteresis between its adsorption and desorption branches, indicative of "bottle-necks" in the mesopore structure. Nitrogen adsorption isotherms for porous sulfonated polydivinylbenzene resins PDVB-2 and PDVB-3 are provided for comparison (FIG. 5).

Glycerol Binding from Aqueous Solutions. Batch type experiments were used to generate isotherms for the binding of glycerol from water by the sorbent variants. Analysis was completed by determination of the glycerol remaining in solution following overnight incubation of varying sorbent masses with glycerol solutions of varied concentration. Analysis of glycerol was based on the method described by ASTM D6584-13.[30] Samples and control solutions were all water-based; water was removed from a 5 mL aliquot using a KD Scientific Centrifan PE-T (Model 78-0070). A stock solution of N-methyl-n-(trimethylsilyl)trifluoroacetamide (MSTFA; 1.2 mL) in pyridine (2 mL) was prepared. This solution (160 μL) was added to the dried sample followed by incubation for 20 min. Heptane (1.6 mL) was then added, and the sample was transferred to an autosampler vial for GC analysis. GC-MS analysis was performed using a Shimadzu GCMS-QP2010 with AOC-20 autoinjector equipped with a Restex Rtx-5 (30 m×0.25 mm ID×0.25 μm df) cross bond 5% diphenyl 95% dimethyl polysiloxane column. A GC injection temperature of 200° C. was used with a 1:1 split ratio at a flow rate of 3.6 mL/min at 69.4 kPa. The oven gradient ramped from 50° C. (1 min hold time) to 180° C. at 15 C/min and then to 300° C. at 20° C/min where it was held for 5 min.

Figure 7A:
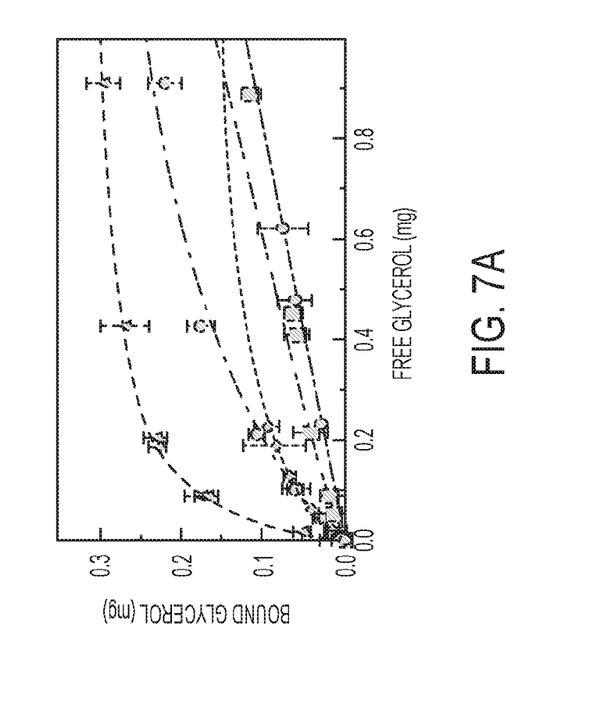
FIGS. 7A and 7B show glycerol binding isotherms for E25-Ph (closely-spaced short dashes), S85-Ph (two long dashes and a short dash), ED11-Ph1 (widely-spaced medium dashes), D13-Ph (triplets of a long dash between two shorter dashes with spaces between), PDVB-2 (alternating long and short dashes) presented for use of equivalent sorbent mass (A) and calculated for equivalent sorbent surface area (B).
Figure 7B:
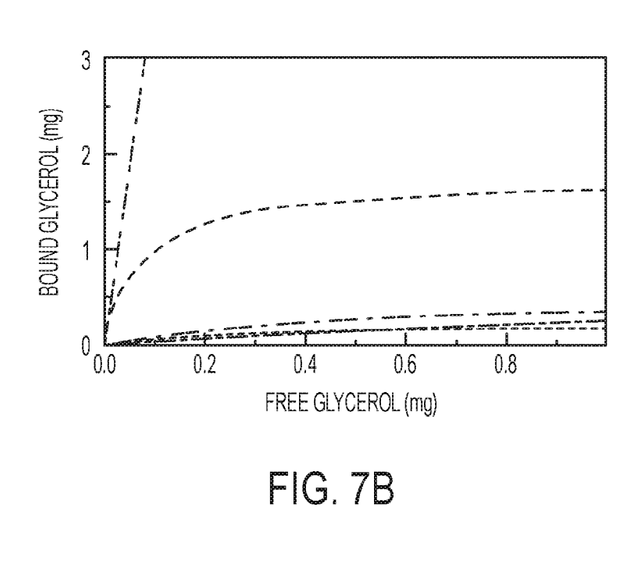

FIG. 7 provides some examples of binding isotherms. Target binding by these types of sorbents has previously been described by phenomenological models such as those represented by the Langmuir and Langmuir-Freundlich formulations.[20,26,31] For the glycerol binding data, the Langmuir-Freundlich equation was used:

$$q = \frac{q_s A k [L]^n}{1 + k[L]^n}$$

Here, q is the amount of target bound per unit sorbent surface area, L is the free ligand, k is the affinity coefficient, n is the homogeneity factor, and A is the total surface area. The typically used saturation capacity is $q_s$. FIGS. 7A and 7B show exemplary glycerol binding isotherms, and Table 2 provides a summary of the calculated parameters for the various materials.

TABLE 2

Parameters generated from application of the Langmuir-Freundlich equation to glycerol binding data.

| Material | $q_s$ (μg/m$^2$) | k (1/mg) | n |
|---|---|---|---|
| S65-Ph | 72.4 | 2.78 | 1 |
| S85-Ph | 42.4 | 1.92 | 1 |
| E25-Ph | 14.9 | 4.78 | 1 |
| E50-Ph | 5.87 | 10.8 | 1 |
| ED11-Ph1 | 145 | 13.5 | 1 |
| ED11-Ph2 | 450 | 24.0 | 1 |
| ED11 | 207 | 0.920 | 1 |
| D13-Ph | 2689 | 3.95 | 1 |
| D13-Ph2 | 1780 | 4.15 | 1 |
| D13a | 5290 | 4.56 | 1 |
| D13b | 811 | 1.96 | 1 |
| D13c | 5190 | 4.45 | 1 |
| ED13 | 81.2 | 0.461 | 1 |
| PDVB-2 | 1059 | 0.019 | 1 |
| PDVB-3 | 1620 | 0.029 | 1 |

Glycerol Capture from Biodiesel. Several of the materials used for capture of glycerol from aqueous solution were also evaluated in a solution based on in-house prepared biodiesel. The solution was prepared through adaptation of a widely available small batch production protocol. Food grade canola oil (1 L) was warmed to 50° C. on a hotplate. In a separate container, methanol (355 mL) and sodium hydroxide (3.5 g) were mixed. This mixture was slowly added to the warmed oil and the result was stirred for 2 h (50° C.). The reacted solution was moved to a reparatory funnel and allowed to settle so that bottom glycerol could be drained. Rotary evaporation was used to remove residual methanol from the final solution and the pH was verified to be neutral. A known concentration of glycerol was added to this preparation for sorbent evaluation and controls were analyzed using a modification of the protocol described above for glycerol binding from aqueous solutions. For sample preparation, the sorbent containing solution was filtered to remove the sorbent (as necessary). A 100 μL aliquot was added to 100 μL MSTFA. This solution was mixed well and incubated at room temperature for 20 min before addition of heptane (8 mL). The result was transferred to an auto sample vial for analysis by the GC-MS protocol described above for glycerol binding from aqueous solutions.

Figure 8:
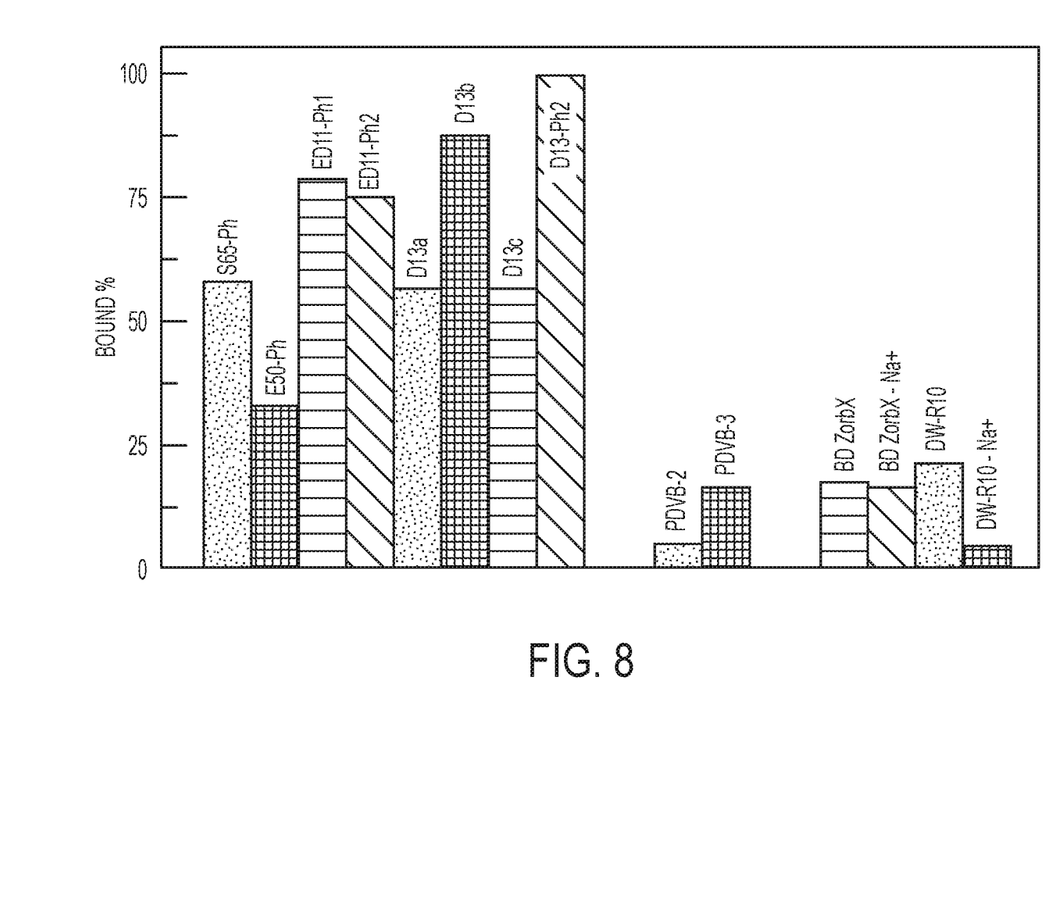
FIG. 8 shows binding of glycerol from spiked biodiesel by the sorbents. Experiment used a solution consisting of 250 µM glycerol in biodiesel (10 mL) with 30 mg sorbent.

FIG. 8 presents data for capture of glycerol from the biodiesel preparation by several of the developed sorbents as well as by the commercial products BD ZorbX Dry Wash Media and DudaLite Dry Wash Resin DW-R10. The figure also shows data for sodium exchanged versions of the commercial media. A Type 6 sorbent dramatically out performs the commercial sorbents as does the Type 3 sorbent.

Figure 9:
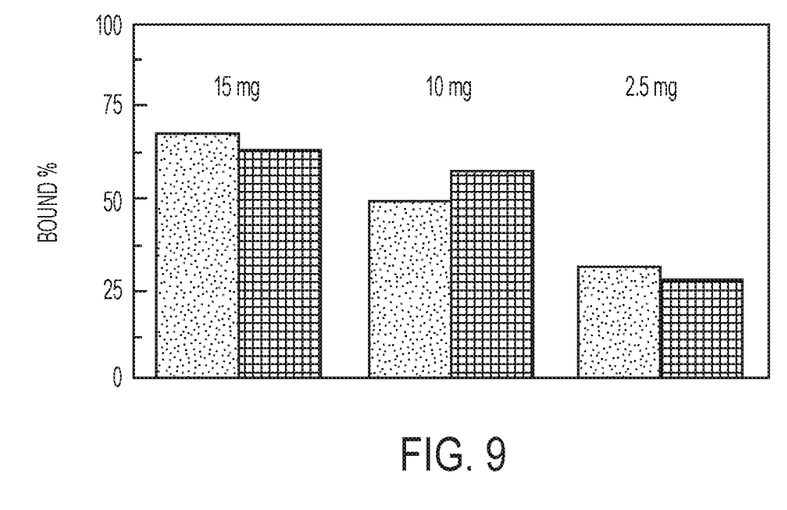
FIG. 9 shows binding of Triton X-100 (250 µM) from water (dotted bars) and spiked biodiesel (gridded bars) by ED11-Ph1 (varied sorbent mass).

Capture of Other Targets. In addition to providing removal of glycerol, the sorbents described here offer capture of other targets of potential interest to biodiesel production and analysis. Triton X-100 was used as a model for detergents. Table 3 provides parameters from Langmuir-Freundlich fits of data sets resulting from batch experiments in aqueous solution. Binding of Triton X-100 from spiked biodiesel samples was also evaluated. As shown in FIG. 9, capture of the target from biodiesel was similar to that from aqueous solution.

TABLE 3

Parameters generated from application of the Langmuir-Freundlich equation to Triton X-100 binding data.

| Material | $q_s$ (μg/m$^2$) | k (1/mg) | n |
|---|---|---|---|
| S65-Ph | 5960 | 0.17 | 1 |
| S85-Ph | 860 | 8.99 | 1 |
| E50-Ph | 310 | 0.02 | 1 |
| ED11-Ph1 | 2200 | 0.15 | 1 |
| ED11-Ph2 | 12200 | 0.03 | 1 |
| ED11 | 2180 | 0.08 | 1 |
| D13-Ph | 48200 | 0.44 | 1 |
| D13-Ph2 | Binds 100% from all experiments | | |
| D13a | 5500 | 11.6 | 1 |
| D13b | Binds 100% from all experiments | | |
| D13c | 31800 | 0.10 | 1 |
| ED13 | Binds 100% from all experiments | | |
| PDVB-2 | 220 | 0.60 | 1 |
| PDVB-3 | 200 | 0.60 | 1 |

Prophetic Applications. The sorbents could be contacted with biodiesel or other liquids for various lengths of time ranging from minutes to hours to days or even longer, for example by introducing a biodiesel to a vessel containing the sorbent and removing a cleaned biodiesel from the vessel. The contacting could occur in various formats allowing continuous, column, or batch type applications. The contacting in these formats could occur as a gravity driven process, with added pressure, or be driven through application of a vacuum. The contacting could be with or without agitation including mechanical agitation such as stirring and/or sonication. The contacting can be at ambient or other temperature, for example at an elevated temperature between ambient and a flash point of the liquid. One or more different types of sorbent can be used. Following contacting, the sorbent(s) can be separated by filtration, centrifugation, or other techniques known in the art. In other embodiments, separation can be aided by passing a liquid (such as biodiesel) over immobilized sorbent, for example in a column.

The used be washed (e.g., with alcohol and/or a aqueous solution) and reused, with glycerol optionally recovered.

Concluding Remarks

Reagents of the type described here provide the potential for improved dry wash media in biodiesel purification processes. The approach, controlling the distribution and concentration of sulfonate groups within the sorbent structure, provides a significant advantage over previous approaches utilized for development of these types of sorbents. The materials offer additional potential in analysis of biodiesel. Similar sorbents have been applied for solid phase extraction, resulting in concentration and purification of targets.

Current efforts in reducing the water necessary for purification of biodiesel are focused on inexpensive and, often, disposable media. The advantages described here offer the potential for media with improved performance characteristics as well as a method for reuse of the material. These characteristics also lead to the potential for enhancing analytical methods applied to biodiesel analysis through their use as a solid-phase extraction sorbent.

All documents mentioned herein are hereby incorporated by reference for the purpose of disclosing and describing the particular materials and methodologies for which the document was cited.

Although the present invention has been described in connection with preferred embodiments thereof, it will be appreciated by those skilled in the art that additions, deletions, modifications, and substitutions not specifically described may be made without departing from the spirit and scope of the invention. Terminology used herein should not be construed as being "means-plus-function" language unless the term "means" is expressly used in association therewith.

REFERENCES (1) Masoumifard, N.; Arnal, P. M.; Kaliaguine, S.; Kleitz, F. Chemsuschem 2015, 8, 2093-2105.
(2) Bender, M. Bioresource Technology 1999, 70, 81-87.
(3) Zhang, Y; Dube, M. A.; McLean, D. D.; Kates, M. Bioresource Technology 2003, 90, 229-240.
(4) You, Y D.; Shie, J. L.; Chang, C. Y.; Huang, S. H.; Pai, C. Y.; Yu, Y H.; Chang, C. F. H. Energy & Fuels 2008, 22, 182-189.
(5) Araujo, V.; Hamacher, S.; Scavarda, L. F. Bioresource Technology 2010, 101, 4415-4422.
(6) Kulkarni, M. G.; Dalai, A. K. Industrial & Engineering Chemistry Research 2006, 45, 2901-2913.
(7) Beck, J. S.; Vartuli, J. C.; Roth, W. J.; Leonowicz, M. E.; Kresge, C. T.; Schmitt, K. D.; Chu, C. T.-W; Olson, D. H.; Sheppard, E. W; McCullen, S. B.; Higgins, J. B.; Schlenker, J. L. J Am Chem Soc 1992, 114, 10834-10843.
(8) Burleigh, M. C.; Markowitz, M. A.; Spector, M. S.; Gaber, B. P. Environ Sci Technol 2002, 36, 2515-2518.
(9) Hatton, B.; Landskron, K.; Whitnall, W.; Perovic, D.; Ozin, G. A. Accounts Chem Res 2005, 38, 305-312.
(10) Hoffmann, F.; Cornelius, M.; Morell, J.; Fröba, M. Angew Chem Int Edit 2006, 45, 3216-3251.
(11) Jayasundera, S.; Burleigh, M. C.; Zeinali, M.; Spector, M. S.; Miller, J. B.; Yan, W. F.; Dai, S.; Markowitz, M. A. J Phys Chem B 2005, 109, 9198-9201.
(12) Kresge, C. T.; Leonowicz, M. E.; Roth, W. J.; Vartuli, J. C.; Beck, J. S. Nature 1992, 359, 710-712.
(13) Li, C.; Yang, J.; Shi, X.; Liu, J.; Yang, Q. Micropor Mesopor Mat 2007, 98, 220-226.
(14) Li, C. M.; Liu, J.; Shi, X.; Yang, J.; Yang, Q. H. J Phys Chem C 2007, 111, 10948-10954.
(15) Margolese, D.; Melero, J. A.; Christiansen, S. C.; Chmelka, B. F.; Stucky, G. D. Chem. Mater. 2000, 12, 2448-2459.
(16) Melde, B. J.; Holland, B. T.; Blanford, C. F.; Stein, A. Chem Mater 1999, 11, 3302-3308.
(17) Zhao, X. S.; Lu, G. Q. J. Phys. Chem. B 1998, 102, 1556-1561.
(18) Loy, D. A.; Shea, K. J. Chem Rev 1995, 95, 1431-1442.
(19) Huo, Q. S.; Margolese, D. I.; Stucky, G. D. Chem Mater 1996, 8, 1147-1160.
(20) Johnson, B. J.; Melde, B. J.; Charles, P. T.; Dinderman, M. A.; Malanoski, A. P.; Leska, I. A.; Qadri, S. A. Talanta 2010, 81, 1454-1460.
(21) Nakanishi, K.; Kobayashi, Y.; Amatani, T.; Hirao, K.; Kodaira, T. Chem Mater 2004, 16, 3652-3658.
(22) Melde, B. J.; Johnson, B. J.; Dinderman, M. A.; Deschamps, J. R. Microporous and Mesoporous Materials 2010, 130, 180-188.
(23) Johnson, B. J.; Melde, B. J.; Peterson, G. W; Schindler, B. J.; Jones, P. Chemical Engineering Science 2012, 68, 376-382.
(24) Dou, B. J.; Hu, Q.; Li, J. J.; Qiao, S. Z.; Hao, Z. P. Journal of Hazardous Materials 2011, 186, 1615-1624.
(25) Dube, D.; Rat, M.; Beland, F.; Kaliaguine, S. Microporous and Mesoporous Materials 2008, 111, 596-603.
(26) Johnson, B. J.; Malanoski, A. P.; Leska, I. A.; Melde, B. J.; Taft, J. R.; Dinderman, M. A.; Deschamps, J. R. Microporous and Mesoporous Materials 2014, 195, 154-160.
(27) Nakanishi, K.; Amatani, T.; Yano, S.; Kodaria, T. Chem Mater 2008, 20, 1108-1115.
(28) Johnson, B. J.; Leska, I. A.; Melde, B. J.; Siefert, R. L.; Malanoski, A. P.; Moore, M. H.; Taft, J. R.; Deschamps, J. R. Materials 2013, 6, 1403-1419.
(29) Chen, B.; Wang, W. S.; Liu, X.; Xue, W. M.; Ma, X. X.; Chen, G. L.; Yu, Q. S.; Li, R. Industrial & Engineering Chemistry Research 2012, 51, 12933-12939.
(30) International, A.: West Conshohocken, Pa., 2013.
(31) Johnson, B. J.; Melde, B. J.; Charles, P. T.; Cardona, D. C.; Dinderman, M. A.; Malanoski, A. P.; Qadri, S. B. Langmuir 2008, 24, 9024-9029.

What is claimed is:

1. A method of removing a contaminant from biodiesel, comprising:
    contacting a mesoporous organosilica sorbent comprising phenyl and sulfonate moieties with a biodiesel containing a contaminant; then
    separating the biodiesel from the sorbent, whereby a fraction of the contaminant in the biodiesel is absorbed by the sorbent and thus removed from the biodiesel.
2. The method of claim 1, wherein said contaminant is glycerol.
3. The method of claim 2, wherein the sorbent is effective to absorb at least 50% of the glycerol.
4. The method of claim 1, wherein said contaminant is a detergent.
5. The method of claim 4, wherein the sorbent is effective to absorb at least 50% of the detergent.
6. The method of claim 1, wherein the sorbent is selected from the group consisting of ED11-Ph1, D13b, and D13-Ph2.

* * * * *